(12) United States Patent
Kim et al.

(10) Patent No.: US 9,900,896 B2
(45) Date of Patent: Feb. 20, 2018

(54) METHOD FOR TRANSMITTING AND RECEIVING INFORMATION FOR INTERFERENCE CANCELLATION, AND APPARATUS THEREFOR

(71) Applicant: LG ELECTRONICS INC., Seoul (KR)

(72) Inventors: Kijun Kim, Seoul (KR); Hakseong Kim, Seoul (KR); Hanbyul Seo, Seoul (KR); Hyungtae Kim, Seoul (KR); Jonghyun Park, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 46 days.

(21) Appl. No.: 14/773,730

(22) PCT Filed: Mar. 5, 2014

(86) PCT No.: PCT/KR2014/001805
§ 371 (c)(1),
(2) Date: Sep. 8, 2015

(87) PCT Pub. No.: WO2014/142464
PCT Pub. Date: Sep. 18, 2014

(65) Prior Publication Data
US 2016/0029395 A1   Jan. 28, 2016

Related U.S. Application Data

(60) Provisional application No. 61/780,815, filed on Mar. 13, 2013.

(51) Int. Cl.
*H04W 4/00* (2009.01)
*H04W 72/08* (2009.01)
(Continued)

(52) U.S. Cl.
CPC ......... *H04W 72/082* (2013.01); *H04J 11/004* (2013.01); *H04L 1/0003* (2013.01);
(Continued)

(58) Field of Classification Search
CPC .................................................. H04W 72/082
(Continued)

(56) References Cited

U.S. PATENT DOCUMENTS

2010/0284379 A1* 11/2010 Bitran ............ H04L 5/0087
370/338
2011/0002365 A1   1/2011 Khayrallah et al.
(Continued)

FOREIGN PATENT DOCUMENTS

KR   10-2009-0094752   9/2009
KR      10-1148607    5/2012

OTHER PUBLICATIONS

PCT International Application No. PCT/KR2014/001805, Written Opinion of the International Searching Authority dated Jun. 9, 2014, 13 pages.

*Primary Examiner* — Shripal Khajuria
(74) *Attorney, Agent, or Firm* — Lee Hong Degerman Kang Waimey

(57) ABSTRACT

A method for receiving interference information for interference cancellation of a user equipment (UE) includes receiving a multi-user downlink (DL) control channel including cyclic redundancy check (CRC) parity bits scrambled by a multi-user identifier (ID), from a base station (BS), wherein the multi-user DL control channel includes control information for each of a plurality of transport blocks (TBs) to be transmitted through a plurality of layers, and the TBs are configured to be transmitted to other UEs in
(Continued)

a multi-user group, and decoding TBs to be transmitted to other UEs in the multi-user group using the control information.

10 Claims, 9 Drawing Sheets

(51) Int. Cl.
*H04J 11/00* (2006.01)
*H04L 1/00* (2006.01)
*H04L 1/18* (2006.01)
*H04L 5/00* (2006.01)
*H04W 72/04* (2009.01)
*H04W 72/12* (2009.01)
*H04W 88/02* (2009.01)
*H04W 88/08* (2009.01)

(52) U.S. Cl.
CPC .......... *H04L 1/1812* (2013.01); *H04L 5/0055* (2013.01); *H04W 72/042* (2013.01); *H04W 72/121* (2013.01); *H04W 88/02* (2013.01); *H04W 88/08* (2013.01)

(58) Field of Classification Search
USPC ........................................................ 370/329
See application file for complete search history.

(56) References Cited

U.S. PATENT DOCUMENTS

| 2011/0019770 | A1 | 1/2011 | Gorokhov et al. |
| 2011/0092240 | A1* | 4/2011 | Aiba ............... H04L 1/0025 455/509 |
| 2012/0113794 | A1 | 5/2012 | Roman et al. |
| 2013/0114577 | A1* | 5/2013 | Cai .................. H04L 5/0053 370/336 |

* cited by examiner

FIG. 5
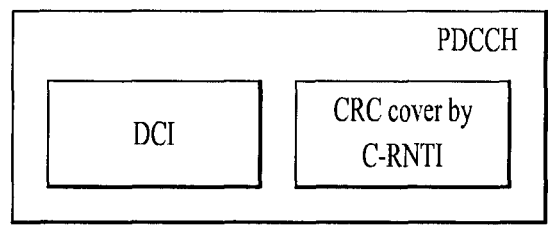
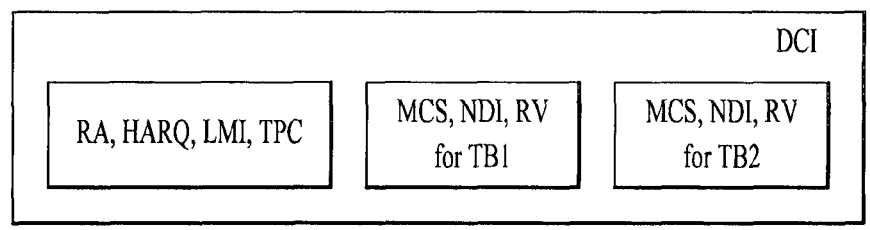

METHOD FOR TRANSMITTING AND RECEIVING INFORMATION FOR INTERFERENCE CANCELLATION, AND APPARATUS THEREFOR

CROSS-REFERENCE TO RELATED APPLICATIONS

This application is the National Stage filing under 35 U.S.C. 371 of International Application No. PCT/KR2014/001805, filed on Mar. 5, 2014, which claims the benefit of U.S. Provisional Application No. 61/780,815, filed on Mar. 13, 2013, the contents of which are all hereby incorporated by reference herein in their entirety.

TECHNICAL FIELD

The present invention relates to a wireless communication system and, more particularly, to a method for transmitting and receiving information for interference cancellation, and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention is to provide a method for efficiently cancelling interferences in a downlink.

It will be appreciated by persons skilled in the art that the effects that can be achieved through the present invention are not limited to what has been particularly described hereinabove and other advantages of the present invention will be more clearly understood from the following detailed description.

Technical Solution

The object of the present invention can be achieved by providing a method for receiving interference information for interference cancellation of a user equipment (UE), the method including receiving a multi-user downlink (DL) control channel with cyclic redundancy check (CRC) parity bits scrambled by a multi-user identifier (ID), from a base station (BS), wherein the multi-user DL control channel includes control information for each of a plurality of transport blocks (TBs) to be transmitted through a plurality of layers, and the TBs are configured to be transmitted to other UEs in a multi-user group, and decoding TBs to be transmitted to other UEs in the multi-user group using the control information.

Alternatively or additionally, each of the TBs may include information about a UE to which the TB is configured to be transmitted.

Alternatively or additionally, the control information for each of the TBs may include modulation and coding scheme (MCS), new data indicator (NDI), and redundancy version (RV) information.

Alternatively or additionally, the multi-user DL control channel may include resource allocation (RA) and hybrid automatic retransmission request (HARD) process information shared by the plurality of TBs.

Alternatively or additionally, the method may further include transmitting a feedback report about a result of the decoding to the BS, the feedback report may be transmitted using uplink (UL) resources already having been allocated to the UE, and, if the decoding is succeeded, even when the TB is to be transmitted to the other UEs, an acknowledgement (ACK) response may be transmitted to the BS as the feedback report.

Alternatively or additionally, the method may further include transmitting a feedback report about a result of the decoding to the BS, the feedback report may be transmitted using resources linked to DL resources for transmitting the multi-user DL control channel, and, only when the TB is to be transmitted to the UE, an ACK response may be transmitted to the BS.

Alternatively or additionally, the TBs to be transmitted to the other UEs may be used by the UE for interference cancellation and not transmitted to a higher layer of the UE.

Alternatively or additionally, the multi-user ID may be allocated to the UEs in the multi-user group, and the UEs in the multi-user group may have DL signal reception qualities above a threshold value.

Alternatively or additionally, a search space for the multi-user DL control channel may be determined based on the multi-user ID, and common to the UEs in the multi-user group.

Alternatively or additionally, if the UE fails to receive the multi-user DL control channel with CRC parity bits scrambled by the multi-user identifier (ID), attempting to receive a DL control channel with CRC parity bits scrambled by the dedicated identifier (ID) which already has been allocated to the UE.

In another aspect of the present invention, provided herein is a user equipment (UE) configured to receive interference information for interference cancellation, the UE including a radio frequency (RF) unit, and a processor configured to control the RF unit, wherein the processor is configured to receive a multi-user downlink (DL) control channel including cyclic redundancy check (CRC) parity bits scrambled by a multi-user identifier (ID), from a base station (BS), wherein the multi-user DL control channel includes control information for each of a plurality of transport blocks (TBs) to be transmitted through a plurality of layers, wherein the TBs are configured to be transmitted to other UEs in a multi-user group, and wherein the UE decodes TBs to be transmitted to other UEs in the multi-user group using the control information.

In a further aspect of the present invention, provided herein is a base station (BS) configured to transmit interference information for assisting a user equipment (UE) with interference cancellation, the BS including a radio frequency (RF) unit, and a processor configured to control the RF unit, wherein the processor is configured to transmit a multi-user downlink (DL) control channel including cyclic redundancy check (CRC) parity bits scrambled with a multi-user identifier (ID), to the UE, wherein the multi-user DL control channel includes control information for each of a plurality of transport blocks (TBs) to be transmitted through a plurality of layers, wherein the TBs are configured to be transmitted to other UEs in a multi-user group, and wherein the BS allows the UE to decode TBs to be transmitted to other UEs in the multi-user group using the control information.

The above description corresponds to part of embodiments of the present invention and various embodiments reflecting technical characteristics of the present invention are derived and understood by those skilled in the art on the basis of the following detailed description of the present invention.

Advantageous Effects

As is apparent from the above description, exemplary embodiments of the present invention can efficiently cancel interference in a downlink, such that a higher-quality communication environment can be expected.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is an exemplary of a DCI (downlink control information) configuration for SU (single user)-MIMO.

BEST MODE

Figure 1:
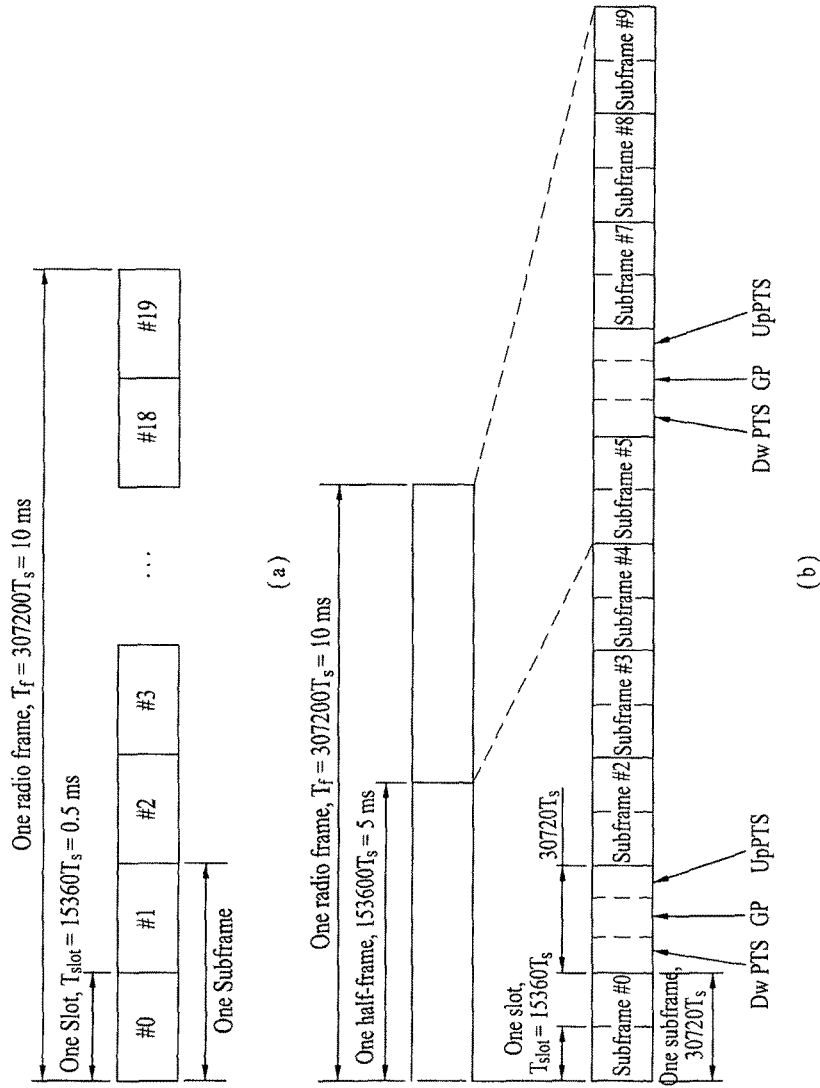
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 2:
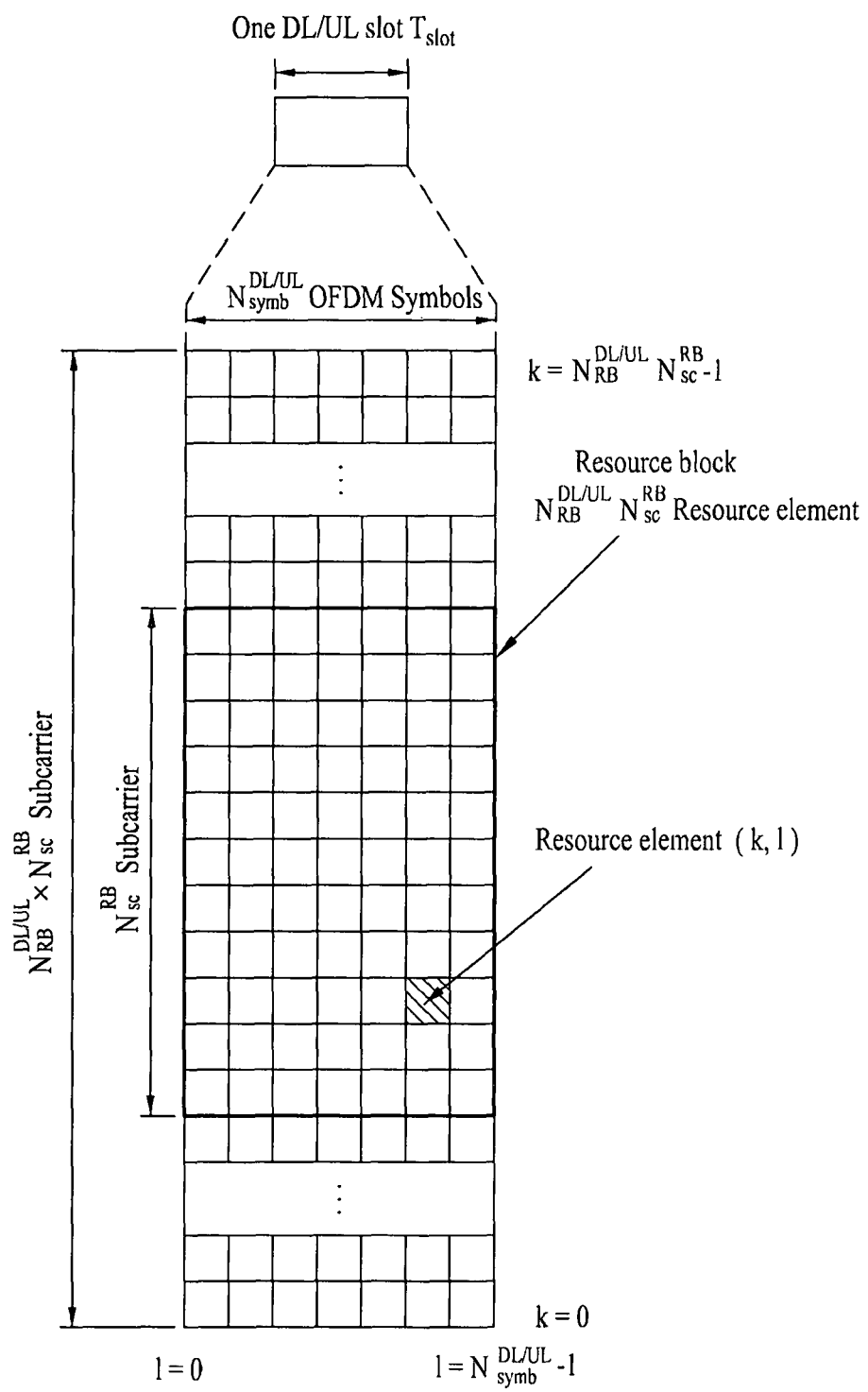
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{DL}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index).

Figure 3:
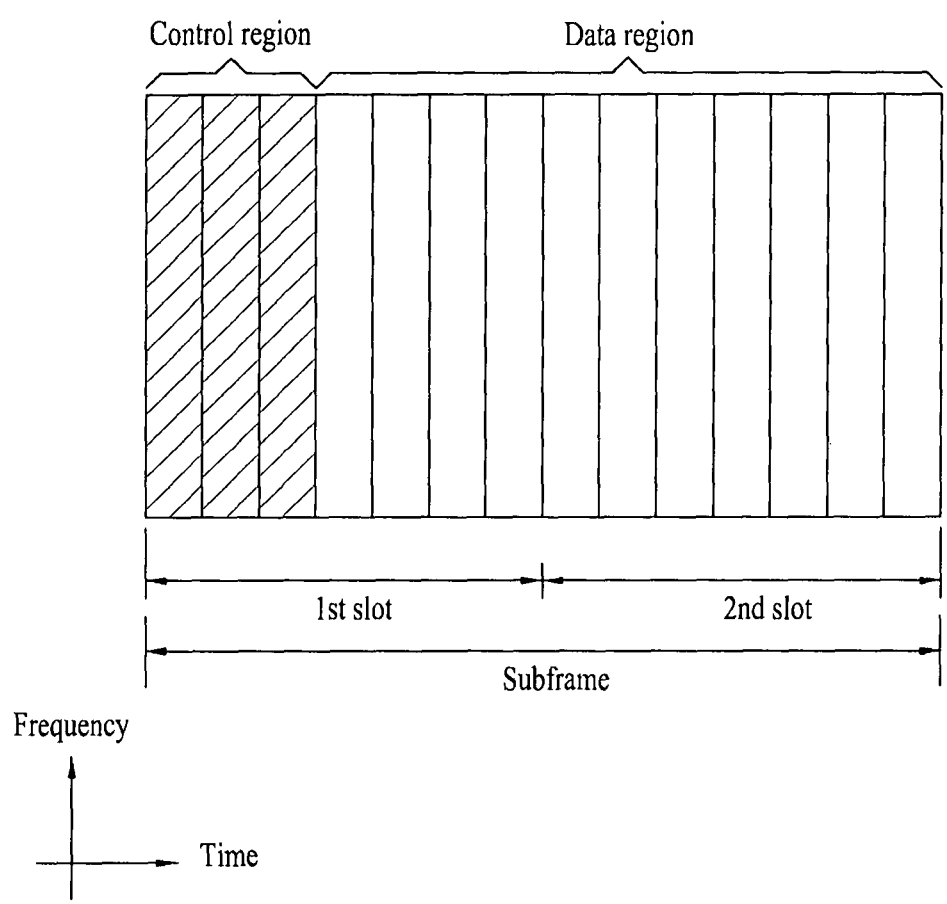
FIG. 3 is a diagram showing a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
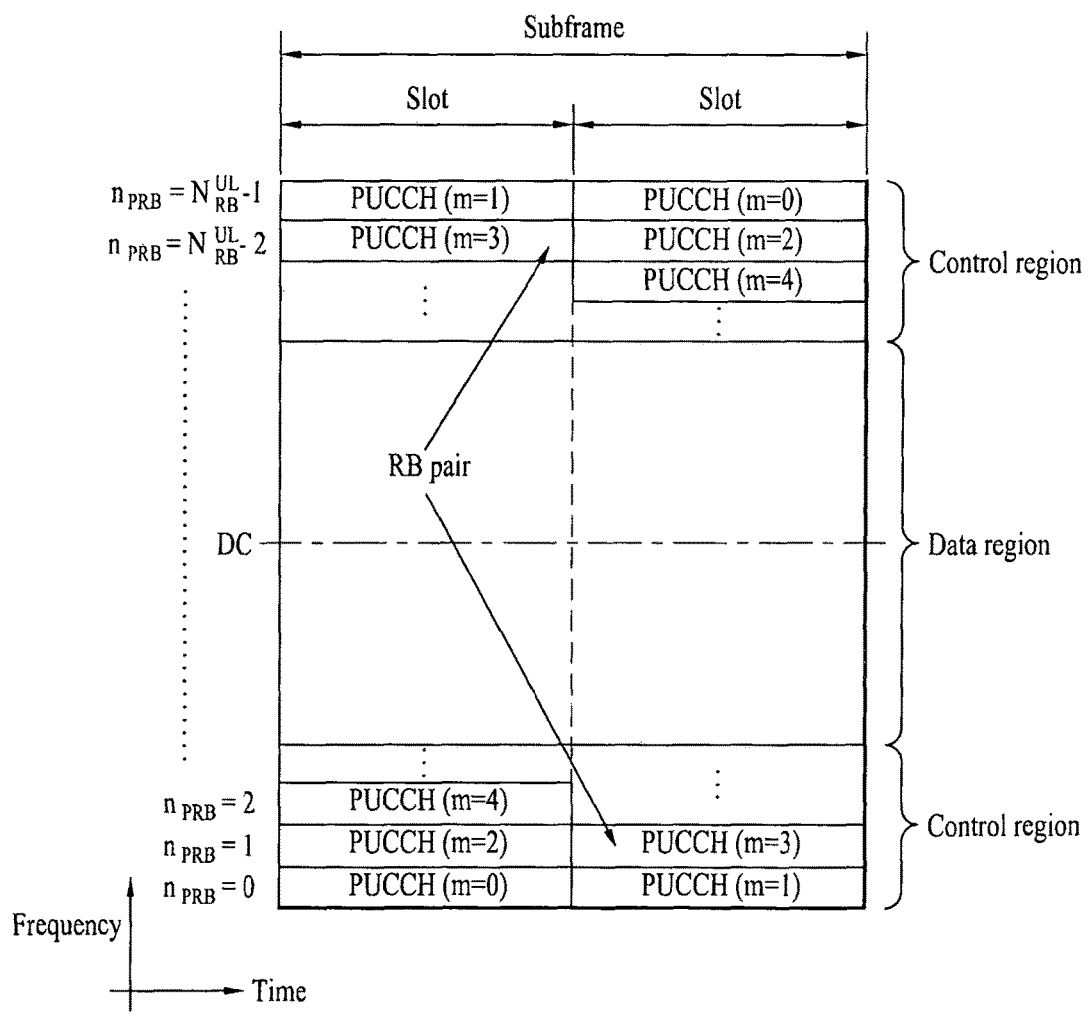
FIG. 4 is a diagram showing an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE/LTE-A.

TABLE 3

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 3, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

In general, a cellular mobile communication system reaches its capacity limitation as an interference-limited system due to inter-cell interference in an urban environment. When one eNB transmits a multi-layer signal of multiple transmission beams by applying multiple antenna transmission scheme, i.e., single user (SU)-MIMO or multi-user (MU)-MIMO, inter-layer interference in a cell is also a major factor that determines capacity limitation of a system. Accordingly, in order to reduce inter-cell interference and intra-cell interference, standardization and development of cooperative transmission and high-performance reception schemes are regarded important and people expend much effort thereon.

A DL cooperative transmission scheme is a scheme for setting a transmission beam to minimize inter-cell interference and intra-cell interference, based on CSI reported by a receiver. This scheme does not greatly increase the complexity of a device in a data reception procedure but its performance depends greatly on the accuracy of CSI report. On the other hand, a high-performance reception scheme is a scheme for achieving better reception performance using characteristics of an interference signal at a receiver end. In this scheme, how to obtain information about the interference signal transmitted together with a signal desired by a device is important. Representative examples of the high-performance reception scheme are as follows.

Linear MMSE (Minimum Mean Squared Error) IRC (Interference Rejection Combining) receiver, Maximum likelihood detection receiver, Interference cancellation receiver As the performance of a receiver is higher, a larger amount of information about an interference signal is required. For example, in an iterative decoding interference cancellation receiver which is known as having the best performance, since a device should decode an interference signal and regenerate an interference signal for cancellation, every piece of information for decoding is required.

A certain level of detection capability is needed to cancel an interference signal. That is, an interference signal may be stably canceled when an interference packet is successfully decoded or when hard decision error probability of a coding symbol of an interference packet is less than a specific value. Accordingly, a modulation and coding scheme (MCS) of an interference signal should be determined in such a manner that an interfered device can stably receive the interference signal. That is, the MCS of each transmission signal should be determined in such a manner that both a UE scheduled to receive a corresponding DL signal and an interfered UE can stably receive the DL signal.

In the LTE system, an eNB transmits information required to decode a PDSCH, which corresponds to a desired signal, to a UE using DCI of a PDCCH. The PDCCH is transmitted by including CRC parity bits to detect an error. In order to indicate a UE to which the PDCCH is to be transmitted, the CRC parity bits are transmitted after being scrambled with a cell-RNTI (C-RNTI) allocated to the UE. The UE performs PDCCH decoding (i.e., blind decoding) a plurality of times on a PDCCH search space given to the UE, and determines that DCI in a corresponding PDCCH has PDSCH scheduling information (e.g., DL grant or UL grant) to be transmitted to the UE, if the decoded CRC parity bits has the C-RNTI allocated to the UE.

In a SU-MIMO transmission scheme of the LTE system, when two or more layers are transmitted, two transport blocks (TBs) are transmitted to apply inter-layer interference cancellation. If one of the two TBs is successfully decoded, the UE regenerates a transmission signal of the corresponding TB, takes it out from a reception signal, and decodes the other TB again in an environment where inter-layer interference is cancelled. To this end, DCI of SU-MIMO has MCS information, a new data indicator (NDI), and a redundancy version (RV) for each of TB1 and TB2.

FIG. 5 shows an example of the configuration of PDCCH in the LTE(-A) system. Information delivered on the PDCCH mainly includes DCI and CRC parity bits masked with a C-RNTI. Although the configuration of DCI differs depending on a DCI format according to a PDSCH transmission mode, FIG. 5 shows an example of DCI of SU-MIMO. The DCI includes a resource allocation (RA) field, HARQ process field, transmit power control (TPC) field, layer mapping information (LMI) field, and fields for transmitting MCS, NDI, and RV information of each TB.

Embodiment 1—Individual DCI Transmission Scheme in Single/Multi-Cell MU-MIMO Environment In the LTE(-A) system, scheduling information of a plurality of PDSCHs co-scheduled to the same time/frequency resources are delivered on individual PDCCHs. Accordingly, in order to find a PDCCH having scheduling information of a co-scheduled interference PDSCH, decoding should be performed on the whole PDCCH search space according to various DCI formats. In this procedure, since a UE does not know a C-RNTI allocated to a UE targeted by each DCI, the UE ignores error detection by CRC parity bits, determines how much resource allocation of a DCI is identical to resource allocation of a desired PDSCH, and decodes only an interference PDSCH which highly requires interference cancellation. In this case, since the number of times that PDCCH blind decoding is performed is greatly increased, performance degradation may be caused due to an increase in fail alarm probability and the complexity of a receiver may be increased.

As such, the present invention promotes complexity reduction and additional performance improvement of the receiver by additionally applying the following scheduling restrictions. A plurality of the following scheduling restrictions may be applied simultaneously.

1) An eNB uses the same transmission mode for co-scheduled PDSCHs. Accordingly, a UE having an improved receiver considers only a DCI format of a PDCCH for a desired PDSCH when searching for a PDCCH for an interference PDSCH. That is, the UE assumes that transmission modes of the desired PDSCH and interference PDSCH are the same.

2) A transmission mode of an interference PDSCH is previously designated and only a corresponding DCI format is considered when searching for a PDCCH for the interference PDSCH.

3) A UE having an improved receiver assumes that a PDCCH of a co-scheduled interference PDSCH is always transmitted through a common search space. An eNB transmits the corresponding PDCCH through the common search space to transmit it to an interference UE in addition to a target UE.

4) At least one interference C-RNTI used by a PDCCH associated with an interference PDSCH is indicated to a UE having an improved receiver, and a search space determined due to the indicated interference C-RNTI is searched for the PDCCH associated with interference PDSCH. In this case, it is checked whether an interference C-RNTI indicated by CRC parity bits of a result of decoding the PDCCH is the same as the interference C-RNTI, and the corresponding PDCCH is ignored if they are not the same.

As an additionally proposed scheme, at which aggregation level and by which CCE a PDCCH having scheduling information of a co-scheduled interference PDSCH are transmitted is indicated using a specific field of the PDCCH. That is, considering that PDSCH1 transmitted to UE1 and PDSCH2 transmitted to UE2 are co-scheduled in the same resources, PDCCH1 is transmitted by putting scheduling information of PDSCH1 into it and masking it with C-RNTI1 allocated to UE1, and PDCCH2 is transmitted by putting scheduling information of PDSCH2 into it and masking it with C-RNTI2 allocated to UE2. At this time, in the proposed scheme, information about an aggregation level of PDCCH2 and a CCE index for transmitting PDCCH2 (FIG. 6, "Ex. PDCCH Information") is indicated using a specific field of PDCCH1. Accordingly, UE1 finds PDCCH1 transmitted to UE1 and checks the location of PDCCH2 having scheduling information of an interference PDSCH (PDSCH2), using a specific field of DCI of PDCCH1.

Alternatively, as another additionally proposed scheme, only by which CCE PDCCH2 having scheduling information of a co-scheduled interference PDSCH is transmitted is indicated using a specific field of PDCCH1 and, in this case, aggregation levels of PDCCH1 and PDCCH2 are the same. That is, a UE searches a search space given to the UE for PDCCH1 masked with a C-RNTI of the UE with respect to each aggregation level, and decodes PDCCH2 at an aggregation level the same as that of PDCCH1 at a CCE location indicated by the corresponding PDCCH1. Here, PDCCH1 and PDCCH2 have the same DCI format. Alternatively, the UE previously receives allocation of a DCI format of PDCCH2 independently from the DCI format of PDCCH1. Otherwise, PDCCH1 indicates a CCE location and DCI format of PDCCH2.

In the proposed scheme, as previously designated information and information indicated by PDCCH1, decoding of PDCCH2 is performed and C-RNTI2 masked to CRC parity bits of PDCCH2 is obtained. The obtained C-RNTI2 is used to obtain a scrambling code of scheduled PDSCH2 from PDCCH2. Here, coding bits of PDSCH2 are scrambled for randomization, and a scrambling code used in this case is generated by applying C-RNTI2.

Figure 6:
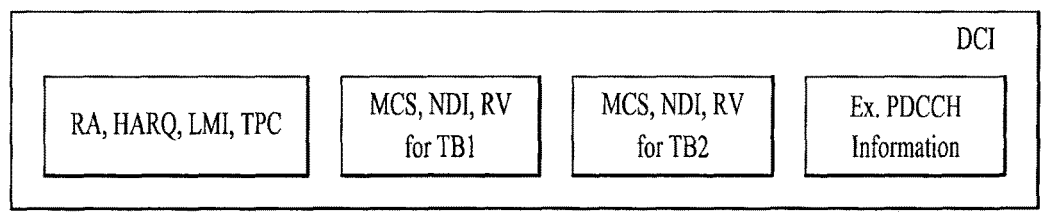
FIG. 6 is an exemplary of a DCI of an embodiment of the present invention.

A DCI configuration according to the currently proposed scheme is illustrated in FIG. 6. The location and format of a PDCCH (PDCCH2) having scheduling information of a co-scheduled PDSCH (PDSCH2) is indicated using extended PDCCH information ("Ex. PDCCH Information").

Embodiment 2—Single DCI Transmission Scheme in Single/Multi-Cell MU-MIMO Environment The current embodiment proposes a scheme for transmitting scheduling information of a desired PDSCH and interference PDSCH using one DCI. That is, the current embodiment proposes a simply extended scheme for transmitting each information field of DCI twice for the desired PDSCH and interference PDSCH. Representatively, resource allocation information of the desired PDSCH and resource allocation information of the interference PDSCH may be individually provided to a UE. In addition, HARQ process information is provided with respect to each of the desired PDSCH and interference PDSCH.

According to the current embodiment, since a DCI field for a PDCCH of the interference PDSCH is additionally provided, the amount of information to be transmitted to a UE is increased. Thus, the number of bits for the PDCCH of the interference PDSCH needs to be reduced.

Therefore, in order to reduce overheads of DCI, resource allocation information may be shared between the desired PDSCH and interference PDSCH. Alternatively, in order to reduce overheads of DCI, HARQ process information may be shared between the desired PDSCH and interference PDSCH.

Alternatively, each information field of DCI may indicate whether the desired PDSCH and interference PDSCH share the same information and/or whether additional information is present, using a reusable flag bit. That is, information is sent to information fields having scheduling information of the desired PDSCH (i.e., each information field of PDCCH1), and a reusable flag bit is provided to each information field of PDCCH1 for information fields having scheduling information of the interference PDSCH. If the reusable flag bit is 1, a corresponding field indicates that the desired PDSCH and interference PDSCH share the same information field and the corresponding information field is not additionally transmitted for the interference PDSCH. If the reusable flag bit is 0, a corresponding field uses a value different from the value used by the corresponding field of the desired PDSCH, and thus the corresponding field is added and transmitted in DCI for the interference PDSCH.

Accordingly, in the current embodiment, the length of DCI varies according to whether a reusable flag bit is set. That is, the DCI has a minimum length if all reusable flag bits are set to 1, and has a maximum length if all reusable flag bits are set to 0. In order to prevent variation of the length of the DCI, if all reusable flag bits are not set to 0, dummy bits are added to fix the length of the DCI. That is, scheduling of the interference PDSCH different from that of the desired PDSCH may be additionally indicated by setting reusable flag bits in consideration of a previously determined length of the DCI.

The current embodiment proposes a scheme for applying DCI of SU-MIMO extensively to the DCI of MU-MIMO. In the proposed scheme, TBs are divided into a desired TB and interference TB, and scheduling information of the desired TB and interference TB using one DCI. This scheme may be extended to indicate scheduling information of a plurality of desired TBs and a plurality of interference TBs using one DCI. In the proposed scheme, resource allocation information and HARQ process information of the DCI are commonly applied to the desired TB and interference TB. Each TB delivers MCS information, new data indicator, and redundancy version information.

In the proposed embodiment, DCI indicates information about a plurality of TBs and designates whether each TB is a desired TB or interference TB. Alternatively, an eNB and UE previously agree that first n TBs are desired TBs and the other TBs are interference TBs. In this case, the value of n is designated not to be greater than 2, or may be fixed to 1. The UE performs ACK/NACK feedback only on a desired TB not on an interference TB.

In contrast, whether a corresponding TB is a desired TB or interference TB may be checked using a flag or MAC address of the TB instead of being indicated using DCI. In this case, whether a corresponding TB is a desired TB or not may be checked after decoding is succeeded. Accordingly, NACK is also transmitted for an interference TB in a HARQ retransmission procedure. As such, this is appropriate for an on/off keying scheme for transmitting a signal only for ACK. That is, a UE transmits an ACK signal if decoding is succeeded and a corresponding TB is determined as a desired TB. A TB determined as an interference TB is not used for a purpose other than interference cancellation. That is, the interference TB is not transferred from a receiver end to a higher layer.

Figure 7:
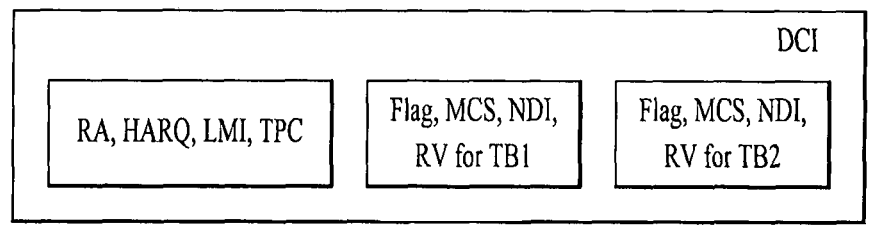
FIG. 7 is an exemplary of a DCI of an embodiment of the present invention.

In the current embodiment, when TB1 is transferred to UE1 and TB2 is transferred to UE2 using the same time/frequency resources, transmission of DCI1 for UE1 and transmission of DCI2 for UE2 are individually performed. Here, DCI1 indicates TB1 as a desired TB and TB2 as an interference TB, and DCI2 indicates TB1 as an interference TB and TB2 as a desired TB. A DCI configuration according to the current embodiment is illustrated in FIG. 7. Whether each TB is a desired TB or interference TB is indicated using a flag bit added to the corresponding TB.

Embodiment 3—Multi-User DCI Transmission Scheme in Single/Multi-Cell MU-MIMO Environment In the current embodiment, since DCI is transmitted individually to co-scheduled UEs, overheads of PDCCHs are increased. In order to solve this, a scheme for transmitting a multi-user PDSCH by applying a multi-user ID is proposed.

In the currently proposed scheme, when TB1 is transferred to UE1 and TB2 is transferred to UE2 using the same time/frequency resources, DCI to which a multi-user ID is applied is transmitted to allow UE1 and UE2 to obtain scheduling information of a multi-user PDSCH. The multi-user PDSCH includes a plurality of TBs transferred through a plurality of layers, and the TBs are designated to be transferred to different UEs. The scheduling information of the multi-user PDSCH is indicated using multi-user DCI. CRC parity bits of a PDCCH for transmitting the multi-user DCI is transmitted after being scrambled with a multi-user ID. Coding bits of the PDSCH are scrambled for randomization, and a scrambling code used in this case is generated by applying a multi-user ID.

Each of a plurality of TBs delivers MCS information, new data indicator, and redundancy version information using multi-user DCI. Resource allocation information and HARQ process information are commonly applied to all TBs to reduce overheads of DCI. Information about a UE to which each TB should be transferred is checked using a UE ID or MAC address field in the TB. In this case, a UE may check whether a corresponding TB is to be transferred to the UE, after decoding is succeeded. Accordingly, the UE transmits an ACK signal if decoding is succeeded and the corresponding TB is determined as a desired TB. In contrast, the UE transmits NACK with respect to all TBs which fail to be decoded. If decoding is succeeded and the corresponding TB is determined as a non-desired TB, the UE may transmit ACK or NACK according to the following scheme for allocating ACK/NACK feedback resources.

ACK/NACK

UL resources for transmitting ACK/NACK feedback may be allocated using one of the following two schemes.

1) A scheme for previously allocating ACK/NACK feedback resources to each UE

In the current scheme, ACK/NACK feedback is transmitted using BPSK or QPSK modulation. In this scheme, even when decoding is succeeded and a corresponding TB is determined as a non-desired TB, a UE transmits ACK. Using this scheme, an eNB may consider the probability of success of a scheduled UE and the probability of successful decoding of an interference TB by an interfered UE, to determine an MCS of each TB.

2) A scheme using ACK/NACK feedback resource linked to a DL CCE index for transmitting multi-user DCI In the current scheme, a k-th TB scheduled using multi-user DCI feeds back ACK/NACK using ACK/NACK feedback resources linked to an index obtained by adding a k-th offset to a DL CCE index for transmitting the multi-user DCI. In the current scheme, since a plurality of UEs which have detected the multi-user DCI commonly use the same ACK/NACK feedback resources, a signal is transmitted only for ACK using an on/off keying modulation scheme. In the proposed scheme, the UE transmits ACK only when decoding is succeeded and a corresponding TB is determined as a desired TB.

A TB determined as a non-desired TB is not used for a purpose other than interference cancellation. That is, a non-desired TB is not transferred from a receiver end to a higher layer.

In the current embodiment, a UE having an improved receiver may receive allocation of a plurality of C-RNTIs which may be divided into a C-RNTI_m for a multi-user ID and a C-RNTI_d for a dedicated-user ID. A PDCCH with CRC parity bits scrambled (or masked) by the C-RNTI_m indicates scheduling information of a multi-user PDSCH using multi-user DCI, and a PDCCH with CRC bits scrambled by the C-RNTI_d indicates scheduling information of a single-user PDSCH using single-user DCI.

A PDCCH search space for searching for the single-user DCI corresponds to the function of the C-RNTI_d and each of UEs in a cell has a unique PDCCH search space. In contrast, a PDCCH search space for searching for the multi-user DCI corresponds to the function of the C-RNTI_m commonly allocated to UEs each having an improved receiver, and the UEs have a common PDCCH search space. As another scheme, a conventional common search space may be used as the PDCCH search space for searching for the multi-user DCI.

In order to reduce the number of times that a UE performs PDCCH blind decoding, subframes for searching for a PDCCH with CRC parity bits scrambled by the C-RNTI_m and subframes for searching for a PDCCH with CRC parity bits scrambled by the C-RNTI_d are previously designated. In addition, a set of HARQ process indices to be used by a multi-user PDSCH and a set of HARQ process indices to be used by a single-user PDSCH are previously designated and indicated. As such, an HARQ receiving buffer may be previously divided into a part for the multi-user PDSCH and a part for the single-user PDSCH.

Meanwhile, in order to increase flexibility, all subframes search for both the multi-user DCI and single-user DCI. In the currently proposed scheme, if both the multi-user DCI and single-user DCI are detected in one subframe, the multi-user DCI is ignored. That is, the single-user DCI has priority. An eNB does not simultaneously transmit data of the single-user PDSCH and multi-user PDSCH in one subframe to a specific UE.

In the currently proposed scheme, the single-user PDSCH and multi-user PDSCH share a HARQ process index. A HARQ process occupied using the single-user PDSCH is continuously used by the single-user PDSCH. That is, if the single-user PDSCH is transmitted using an n-th HARQ process (HARQ process n) but NACK is generated, retransmission is allowed only using the single-user PDSCH. If a HARQ buffer of the HARQ process n is filled due to NACK of the single-user PDSCH, the multi-user PDSCH of the HARQ process n received while the HARQ buffer is filled is ignored. If the HARQ buffer of the HARQ process n is available, the multi-user PDSCH of the HARQ process n is decoded and buffering is performed in the case of NACK.

Although only one C-RNTI_m for a multi-user ID is allocated to a UE having an improved receiver in the above description, the currently proposed scheme is extended to allocate a plurality of C-RNTI_m to a UE having an improved receiver. In this case, the HARQ buffer is controlled by giving priority to each C-RNTI_m.

Transmission Power Control

Single-user DCI includes a TPC field to control transmit power of a UL PUCCH. Transmit power of a PUCCH for reporting ACK/NACK or CSI is controlled according to information of a corresponding TPC field. Since multi-user DCI is detected by a plurality of UEs and a UE to which the multi-user DCI is targeted is not known until a corresponding PDSCH is completely decoded, the multi-user DCI does not include a TPC field.

As an additionally proposed scheme, a multi-user DCI does not include a TPC field, and a UE ID and TPC field are included and transmitted in a MAC header of each TB of a multi-user PDSCH. A UE may detect a UE ID and TPC field from a MAC header if a corresponding TB is successfully decoded, and control transmit power of a PUCCH according to the corresponding TPC field if the UE ID is identical to its UE ID.

As an additionally proposed scheme, multi-user DCI includes a TPC field, a corresponding multi-user PDSCH is decoded, and a corresponding UE may control transmit power of a PUCCH according to the TCP field of the multi-user DCI if a plurality of TBs include at least one TB to be transferred to the UE.

UE Grouping

All UEs in a UE group which has received allocation of the same multi-user ID attempt to commonly receive a multi-user PDSCH and multi-user PDCCH. In view of an eNB, UEs to receive allocation of the same multi-user ID needs to be grouped to increase the capacity of a whole system. As a proposed scheme, UEs having similar reception qualities are grouped as the same group. That is, the eNB may group UEs located at the center of a cell and having good reception quality to allocate a common multi-user ID (C-RNTI_ml) thereto, and group UEs located at a cell edge and having bad reception quality to allocate a common multi-user ID (C-RNTI_m2) thereto. In this grouping method, since an interference TB as well as a desired TB should have a certain level of detection capability for interference cancellation, the two TBs should have similar MCSs.

With respect to a spatial location, grouping of UEs capable of supporting a high rank with similar transmission beams at the same location is preferred in view of interference cancellation. However, if a receiver selectively uses interference cancellation and MMSE-IRC, UEs which prefer orthogonal transmission beams are grouped as one group. A UE checks a reference signal reception state and MCS of a co-scheduled interference TB and determines whether to use only a MMSE-IRC reception scheme or to additionally use an IC mode.

Number of Supportable TBs

In the above proposed schemes, the number of TBs simultaneously supportable by a UE in one subframe is restrictive. In particular, as the number of supportable TBs is increased, the decoding complexity of the UE and the storing space of a HARQ buffer are increased. Accordingly, the UE reports a maximum number of supportable TBs according to the capability of the UE in an initial registration procedure. Specifically, a maximum size of supportable TBs may be reported the same with respect to all bands supported by the UE. Alternatively, the maximum size of supportable TBs may be reported with respect to each band supported by the UE or, if the UE supports carrier aggregation (CA), with respect to each combination of CA bands or/and each band supported by the band combination.

An eNB does not schedule a TB larger than the maximum size of supportable TBs reported by the UE, to the UE in a corresponding band. That is, if the UE reports that the UE is capable of decode up to four TBs in one subframe in a specific band, the eNB does not transmit information of five or more TBs in DCI including scheduling information in one subframe of the corresponding UE.

Figure 8:
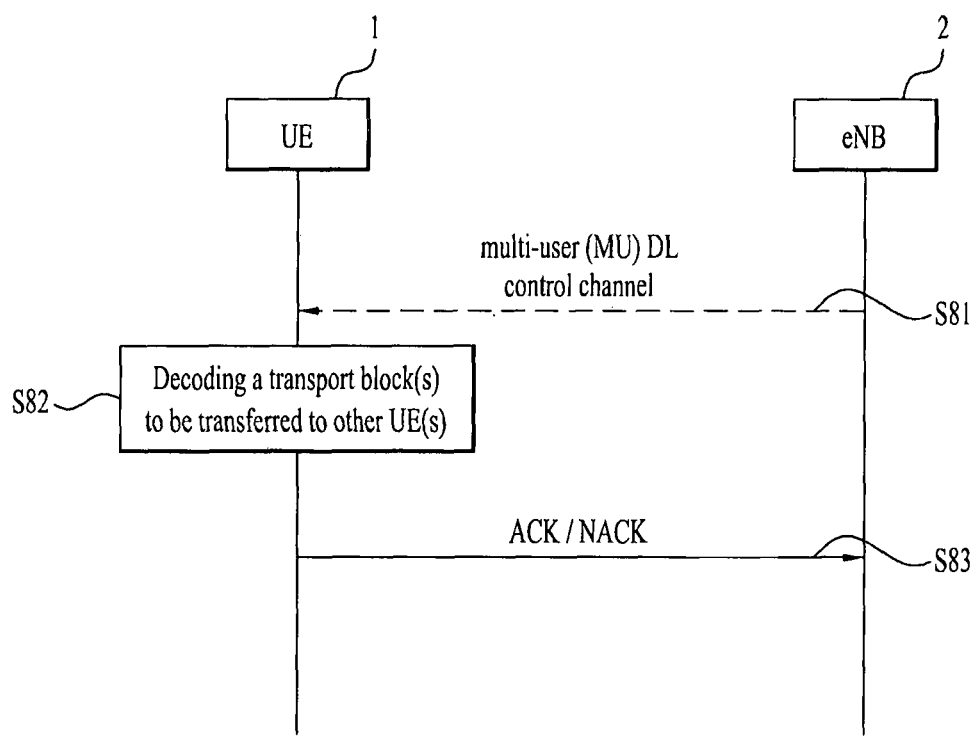
FIG. 8 is a diagram showing a procedure of an embodiment of the present invention.

FIG. 8 is a diagram showing a procedure of an embodiment of the present invention. In a wireless communication system in which the procedure of FIG. 8 is performed, multiple layers are present, a DL signal is transmitted to a UE, and the UE includes a high-performance receiver, for example, interference cancellation receiver.

A UE 1 may receive a multi-user DL control channel with CRC parity bits scrambled by a multi-user identifier (ID) from an eNB 2 (S81). The multi-user DL control channel may include control information for each of a plurality of TBs to be transferred through a plurality of layers. In addition, each of the TBs may be configured to be transferred to different UEs in a multi-user group. That is, each TB is for a specific UE and, in the present invention, for inter-layer interference cancellation in multiple layer transmission, in order to eliminate a DL signal for another UE from a reception signal of the specific UE, control information for the other UE is provided to the specific UE through the multi-user DL control channel.

The UE 1 may decode TB(s) to be transferred to other UE(s) in the multi-user group using control information for the TB(s) to be transferred to the other UE(s) (S82).

Meanwhile, information about a UE to which each of the TBs is to be transferred may be included in the TB.

The control information for each of the TBs may include modulation and coding scheme (MCS), new data indicator (NDI), and redundancy version (RV) information. The multi-user DL control channel may include resource allocation (RA) and hybrid automatic retransmission request (HARQ) process information shared by the TBs.

In addition, the UE 1 may further transmit a feedback report about a result of the decoding to the eNB 2 (S83). In this case, the feedback report may be transmitted using UL resources previously allocated to the UE 1. Furthermore, if the decoding is succeeded, even when the TB is to be transferred to the other UE, an acknowledgement (ACK) response thereof may be transmitted to the eNB 2.

Optionally or alternatively, the UE 1 may further transmit a feedback report about the result of the decoding to the eNB 2 (S83). The feedback report may be transmitted using resources linked to DL resources for transmitting the multi-user DL control channel. In this case, only when the TB is to be transferred to the UE 1, an ACK response may be transmitted to the eNB 2.

In addition, the TB(s) to be transferred to the other UE(s) may be used by the UE 1 for interference cancellation and not transmitted to a higher layer.

The multi-user ID may be allocated to the UEs in the multi-user group, and the UEs in the multi-user group may have DL signal reception qualities above a threshold value. That is, UEs having similar reception qualities may be allocated to one multi-user group, and one multi-user ID may be allocated to each multi-user group.

A search space for the multi-user DL control channel may be determined due to the multi-user ID, and commonly applied to or shared by the UEs in the multi-user group.

The embodiment of FIG. 8 may alternatively or additionally include at least one of the previous embodiments.

Figure 9:
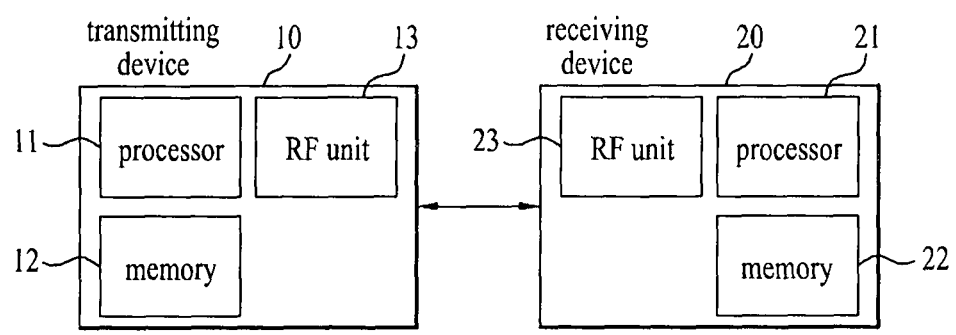
FIG. 9 is a block diagram of an apparatus for implementing embodiment(s) of the present invention.

FIG. 9 is a block diagram of a transmitting device 10 and a receiving device 20 configured to implement exemplary embodiments of the present invention. Referring to FIG. 9, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

MODE FOR INVENTION

Various embodiments have been described in the best mode for carrying out the invention.

INDUSTRIAL APPLICABILITY

The present invention is applicable to a wireless communication device such as a user equipment (UE), relay, or base station (BS).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for receiving interference information for interference cancellation of a user equipment (UE), the method comprising:
   receiving, by the UE, a multi-user downlink (DL) control channel with cyclic redundancy check (CRC) parity bits scrambled by a multi-user identifier (ID), from a base station (BS),
   wherein the multi-user DL control channel includes control information for each of a plurality of transport blocks (TBs) to be transmitted through a plurality of layers, and each of the plurality of TBs are configured for transmission to different UEs in a multi-user group, the different UEs including the UE;
   decoding, by the UE, each of the plurality of TBs using the control information; and
   transmitting, by the UE, a feedback report about a result of the decoding to the BS,
   wherein the feedback report is transmitted using uplink (UL) resources already having been allocated to the UE, and
   wherein, if the decoding is successful, the feedback report comprises an acknowledgement (ACK) response for one or more TBs configured for transmission to one or more UEs other than the UE in the multi-user group.

2. The method according to claim 1, wherein each of the plurality of TBs include information about a UE to which the TB is configured to be transmitted.

3. The method according to claim 1, wherein the control information for each of the plurality of TBs includes modulation and coding scheme (MCS), new data indicator (NDI), and redundancy version (RV) information.

4. The method according to claim 1, wherein the multi-user DL control channel includes resource allocation (RA) and hybrid automatic retransmission request (HARQ) process information shared by the plurality of TBs.

5. The method according to claim 1, wherein the decoded TBs configured for transmission to one or more UEs other than the UE are used by the UE for interference cancellation and are not transmitted to a higher layer of the UE.

6. The method according to claim 1, wherein the multi-user ID is allocated to the UEs in the multi-user group, and the UEs in the multi-user group have DL signal reception qualities above a threshold value.

7. The method according to claim 1, wherein a search space for the multi-user DL control channel is determined based on the multi-user ID, and common to the UEs in the multi-user group.

8. The method according to claim 1, wherein if the UE succeeds in receiving both the multi-user DL control channel and a DL control channel with cyclic redundancy check (CRC) parity bits scrambled by the dedicated identifier (ID) in a subframe, the method further comprises:
   ignoring the multi-user DL control channel.

9. A user equipment (UE) configured to receive interference information for interference cancellation, the UE comprising:
   a radio frequency (RF) unit; and
   a processor configured to control the RF unit,
   wherein the processor controls the RF unit to:
      receive a multi-user downlink (DL) control channel comprising cyclic redundancy check (CRC) parity bits scrambled by a multi-user identifier (ID), from a base station (BS),
      wherein the multi-user DL control channel includes control information for each of a plurality of transport blocks (TBs) to be transmitted through a plurality of layers,
      wherein each of the plurality of TBs are configured for transmission to different UEs in a multi-user group, the different UEs including the UE,
      decode each of the plurality of TBs using the control information, and
      transmit a feedback report about a result of the decoding to the BS,
      wherein the feedback report is transmitted using uplink (UL) resources already having been allocated to the UE, and
      wherein, if the decoding is successful, the feedback report comprises an acknowledgement (ACK) response for one or more TBs configured for transmission to one or more UEs other than the UE in the multi-user group.

10. A base station (BS) configured to transmit interference information for assisting a user equipment (UE) with interference cancellation, the BS comprising:
   a radio frequency (RF) unit; and
   a processor configured to control the RF unit, wherein the processor controls the RF unit to:
  transmit a multi-user downlink (DL) control channel comprising cyclic redundancy check (CRC) parity bits scrambled by a multi-user identifier (ID), to the UE,
  wherein the multi-user DL control channel includes control information for each of a plurality of transport blocks (TBs) to be transmitted through a plurality of layers,
  wherein each of the plurality of TBs are configured for transmission to different UEs in a multi-user group, the different UEs including the UE,
  wherein the BS allows the UE to decode each of the plurality of TBs using the control information, and
  transmit a feedback report about a result of the decoding to the BS,
  wherein the feedback report is transmitted using uplink (UL) resources already having been allocated to the UE, and
  wherein, if the decoding is successful, the feedback report comprises an acknowledgement (ACK) response for one or more TBs configured for transmission to one or more UEs other than the UE in the multi-user group.

* * * * *